(12) United States Patent
Yamashita et al.

(10) Patent No.: US 12,507,098 B2
(45) Date of Patent: Dec. 23, 2025

(54) MOBILE TERMINAL TESTING DEVICE AND MOBILE TERMINAL TESTING METHOD

(71) Applicant: ANRITSU CORPORATION, Kanagawa (JP)

(72) Inventors: Shusaku Yamashita, Kanagawa (JP); Toru Yamasaki, Kanagawa (JP); Masahiro Arayama, Kanagawa (JP); Akihito Yoshito, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 272 days.

(21) Appl. No.: 18/522,811

(22) Filed: Nov. 29, 2023

(65) Prior Publication Data

US 2024/0187895 A1 Jun. 6, 2024

(30) Foreign Application Priority Data

Dec. 5, 2022 (JP) ................................ 2022-194094

(51) Int. Cl.
*H04W 24/08* (2009.01)
*H04L 5/14* (2006.01)

(52) U.S. Cl.
CPC ............... *H04W 24/08* (2013.01); *H04L 5/14* (2013.01)

(58) Field of Classification Search
None
See application file for complete search history.

(56) References Cited

U.S. PATENT DOCUMENTS

| 8,478,263 | B1* | 7/2013 | Lan | H04W 24/08 455/115.2 |
| 2008/0108316 | A1* | 5/2008 | Joung | H04B 17/0085 455/226.1 |
| 2014/0141832 | A1* | 5/2014 | Liang | H04W 52/242 455/522 |
| 2014/0321303 | A1* | 10/2014 | Iyer | H04L 43/50 370/252 |
| 2015/0148051 | A1* | 5/2015 | Togashi | H04W 52/38 455/561 |
| 2017/0135106 | A1* | 5/2017 | Li | H04L 5/005 |
| 2017/0359739 | A1* | 12/2017 | Reed | H04W 16/28 |

(Continued)

FOREIGN PATENT DOCUMENTS

JP 2021-175028 A 11/2021

*Primary Examiner* — Otis L Thompson, Jr.
(74) *Attorney, Agent, or Firm* — McDonald Hopkins LLC

(57) ABSTRACT

A mobile terminal testing device includes: a pseudo base station unit that simulates a base station communicating with a mobile terminal; a scheduling information setting unit that sets scheduling information for specifying any one of a first carrier and a second carrier used for an uplink from the mobile terminal to the base station, for each slot of the uplink; a base station control unit that controls the pseudo base station unit based on the scheduling information; a first RF measurement unit that measures a first UL signal, which is transmitted from the mobile terminal to the pseudo base station unit using the first carrier, based on the scheduling information; and a second RF measurement unit that measures a second UL signal, which is transmitted from the mobile terminal to the pseudo base station unit using the second carrier, based on the scheduling information.

10 Claims, 13 Drawing Sheets

(56) References Cited

U.S. PATENT DOCUMENTS

| | | | | |
|---|---|---|---|---|
| 2017/0366282 A1* | 12/2017 | Aoki | .................... | H04W 24/06 |
| 2019/0037424 A1* | 1/2019 | Shirasaki | ................ | H04L 5/001 |
| 2019/0103926 A1* | 4/2019 | Chen | ................... | H04B 17/102 |
| 2021/0258084 A1* | 8/2021 | Abadie | ................ | H04W 24/06 |
| 2021/0266080 A1* | 8/2021 | Inoue | .................... | H04B 17/15 |
| 2021/0266766 A1* | 8/2021 | Kano | .................... | H04L 5/0048 |
| 2021/0281333 A1* | 9/2021 | Inoue | ................ | H04B 17/0085 |
| 2021/0328689 A1 | 10/2021 | Wu et al. | | |
| 2023/0387996 A1* | 11/2023 | Leather | ................ | H04W 72/51 |

* cited by examiner

When using UL FDD
(not transmitting TDD, transmitting FDD 1Tx)

When using UL TDD
(transmitting TDD 2Tx, not transmitting FDD)

| Subframe | 0 | 1 | 2 | 3 | 4 | 5 | 6 | 7 | 8 | 9 |
|---|---|---|---|---|---|---|---|---|---|---|
| Slot | 0 | 1 | 2 | 3 | 4 | 5 | 6 | 7 | 8 | 9 |
| FDD-N 15kHz | D | D | D | D | D | D | D | D | D | D |
|  | U | U | U | U | U | U | U | U | U | U |
| UL DCI | ON | OFF | ON | ON | ON | ON | OFF | ON | ON | ON |
| K2 | 3 | - | 3 | 3 | 3 | 3 | - | 3 | 3 | 3 |
| UL Type | A | - | A | A | A | A | - | A | A | A |
| UL S | 0 | - | 0 | 0 | 0 | 0 | - | 0 | 0 | 0 |
| UL L | 10 | - | 14 | 14 | 14 | 10 | - | 14 | 14 | 14 |
| TDD-N 30kHz | D D | D D | D D | D S | U U | D D | D D | D D | D S | U U |
| UL DCI | OFF | OFF | ON | ON OFF | OFF | OFF | ON | ON | ON OFF | OFF |
| K2 | - | - | 3 | 3 - | - | - | 3 | 3 | 3 - | - |
| UL Type | - | - | - | - A | A | - | - | - | - B | A |
| UL S | - | - | - | - 0 | 0 | - | - | - | - 12 | 0 |
| UL L | - | - | - | - 12 | 14 | - | - | - | - 2 | 14 |

FIG. 8

| Subframe | 0 | | 1 | | 2 | | 3 | | 4 | | 5 | | 6 | | 7 | | 8 | | 9 | |
|---|---|---|---|---|---|---|---|---|---|---|---|---|---|---|---|---|---|---|---|---|
| Slot | 0 | | 1 | | 2 | | 3 | | 4 | | 5 | | 6 | | 7 | | 8 | | 9 | |
| SUL-N 15kHz | U | | U | | U | | U | | - | | U | | U | | U | | U | | - | |

| Slot | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| TDD-N 30kHz | D | D | D | D | D | D | D | S | U | U | D | D | D | D | D | D | D | S | U | U |

| NUL | UL DCI | OFF | OFF | OFF | OFF | OFF | ON | ON | - | - | - | OFF | OFF | OFF | OFF | OFF | OFF | ON | ON | - | - |
| | K2 | | | | | | 2 | 2 | | | | | | | | | | 2 | 2 | | |
| | UL Type | | | | | | | | B | A | | | | | | | | | | B | A |
| | UL S | | | | | | | | 1 | 0 | | | | | | | | | | 1 | 0 |
| | UL L | | | | | | | | 13 | 12 | | | | | | | | | | 13 | 12 |

| SUL | UL DCI | ON | ON | ON | ON | ON | - | - | - | - | - | ON | ON | ON | ON | ON | ON | - | - | - | - |
| | K2 | 3 | 4 | 4 | 3 | 4 | | | | | | 3 | 4 | 4 | 3 | 4 | 5 | | | | |
| | UL Type | A | B | A | A | A | | | | | | A | B | A | A | A | A | | | | |
| | UL S | 0 | 3 | 0 | 0 | 0 | | | | | | 0 | 3 | 0 | 0 | 0 | 0 | | | | |
| | UL L | 11 | 11 | 14 | 13 | 14 | | | | | | 11 | 11 | 14 | 13 | 14 | 14 | | | | |

FIG. 9

MOBILE TERMINAL TESTING DEVICE AND MOBILE TERMINAL TESTING METHOD

TECHNICAL FIELD

The present invention relates to a mobile terminal testing device that tests a mobile terminal and a mobile terminal testing method.

BACKGROUND ART

When a mobile terminal such as a mobile phone, a data communication terminal, or an in-vehicle communication terminal is developed, it is necessary to test whether or not the developed mobile terminal can normally perform communication. Therefore, a mobile terminal to be tested is connected to a testing device operated as a pseudo base station that simulates functions of an actual base station to perform communication between the testing device and the mobile terminal, and a test of confirming contents of the communication is performed (for example, see Patent Document 1).

Patent Document 1 discloses a mobile terminal testing device capable of displaying setting information about each multiplexed signal forming a multiplexed signal on one screen, and changing the selected setting information in a mobile terminal test.

RELATED ART DOCUMENT

Patent Document

[Patent Document 1] JP-A-2021-175028

DISCLOSURE OF THE INVENTION

Problem that the Invention is to Solve

To improve a capacity of an uplink (UP) from the mobile terminal to the base station, latency, and the like, an "Uplink-Tx Switching" (hereinafter referred to as "UL switching") technology or function, which switches cells or frequency bands for transmitting UL signals in slot units, has been known. For example, see 3rd Generation Partnership Project (3GPP) TS 38.214 6.1.6. Therefore, it is necessary to test the UL switching function of the mobile terminal.

However, in the conventional mobile terminal testing device as described in Patent Document 1, there is a problem in that it is not possible to test a case where a UL carrier, such as a cell or a frequency band for transmitting UL signals, changes for each slot as in UL switching.

The present invention has been made to solve such a problem, and an object of the present invention is to provide a mobile terminal testing device capable of testing a case where a UL carrier, such as a cell or a frequency band for transmitting UL signals, changes in slot units as in UL switching, and a mobile terminal testing method.

Means for Solving the Problem

A mobile terminal testing device of the present invention is a mobile terminal testing device 1 that tests a mobile terminal 2, which includes: a pseudo base station unit 16 that simulates a base station communicating with the mobile terminal; a setting unit 12 that sets scheduling information for specifying any one of a first carrier and a second carrier for each slot of an uplink from the mobile terminal to the base station as a communication resource used for the uplink; a control unit 13 that controls the pseudo base station unit based on the scheduling information; a first measurement unit 14 that measures a first uplink signal, which is transmitted from the mobile terminal to the pseudo base station unit using the first carrier, based on the scheduling information; and a second measurement unit 15 that measures a second uplink signal, which is transmitted from the mobile terminal to the pseudo base station unit using the second carrier, based on the scheduling information.

With this configuration, the mobile terminal testing device of the present invention can set scheduling information suitable for the test by the setting unit, even if a case where the UL carrier changes in slot units as in UL switching is tested. In addition, the first measurement unit corresponding to the first carrier and the second measurement unit corresponding to the second carrier are separately provided to measure the first UL signal and the second UL signal simultaneously or in parallel based on the scheduling information suitable for the test, so that it is possible to perform the measurement of the first UL signal and the second UL signal even if the case where the UL carrier changes in slot units as in UL switching is tested.

Further, in the mobile terminal testing device of the present invention, the first carrier may be a carrier of a first cell using frequency division duplex (FDD), and the second carrier may be a carrier of a second cell using time division duplex (TDD).

With this configuration, the mobile terminal testing device of the present invention can test a case where a cell for transmitting the UL signals changes in slot units as in a carrier aggregation (CA)-based UL switching. For example, in an area in which both the primary component carrier (PCC) of the primary cell (PCell) of FDD and the secondary component carrier (SCC) of the secondary cell (SCell) of TDD can be used, a mobile terminal corresponding to inter-band 2 carrier aggregation (2CA) can test the UL switching function of switching the UL carrier between the PCC and the SCC.

Further, in the mobile terminal testing device of the present invention, the first carrier may be a carrier of a first frequency band using time division duplex (TDD), and the second carrier may be a carrier of a second frequency band using the time division duplex (TDD) in the same cell as the first frequency band.

With this configuration, the mobile terminal testing device of the present invention can test a case where a frequency band for transmitting the UL signals changes in slot units as in UL switching. For example, it is possible to test the UL switching function of improving UL capacity and latency by switching the UL carrier between a supplementary uplink (SUL) and a normal uplink (NUL) such that the SUL is used in a slot in which the NUL slot of TDD is not assigned.

Further, the mobile terminal testing device of the present invention may further include a display unit 18 that displays, on the same time axis, a time waveform of the first uplink signal measured by the first measurement unit and a time waveform of the second uplink signal measured by the second measurement unit.

With this configuration, the mobile terminal testing device of the present invention can easily confirm the switching period necessary for switching between the first UL signal and the second UL signal. Accordingly, it is possible to easily perform time mask measurement in the test of the UL switching function.

Further, in the mobile terminal testing device of the present invention, the setting unit may set the scheduling information such that switching between the first carrier and the second carrier in the uplink is performed in a slot of any one of the first carrier and the second carrier, and the display unit may further display, on the same time axis, a range of the slot in which the switching is performed.

With this configuration, the mobile terminal testing device of the present invention can easily determine suitability of a slot or a carrier in which the UL switching has been performed.

Further, a mobile terminal testing method of the present invention, which is performed by a mobile terminal testing device 1 including a pseudo base station unit 16 that simulates a base station communicating with a mobile terminal 2 and testing the mobile terminal, includes: setting scheduling information for specifying any one of a first carrier and a second carrier for each slot of an uplink from the mobile terminal to the base station as a communication resource used for the uplink; controlling the pseudo base station unit based on the scheduling information; measuring a first uplink signal, which is transmitted from the mobile terminal to the pseudo base station unit using the first carrier, based on the scheduling information; and measuring a second uplink signal, which is transmitted from the mobile terminal to the pseudo base station unit using the second carrier, based on the scheduling information.

In addition, in the mobile terminal testing method of the present invention, the first carrier may be a carrier of a first cell using frequency division duplex (FDD), and the second carrier may be a carrier of a second cell using time division duplex (TDD).

In addition, in the mobile terminal testing method of the present invention, the first carrier may be a carrier of a first frequency band using time division duplex (TDD), and the second carrier may be a carrier of a second frequency band using the time division duplex (TDD) in the same cell as the first frequency band.

In addition, the mobile terminal testing method of the present invention may further include: displaying, on the same time axis, a time waveform of the measured first uplink signal and a time waveform of the measured second uplink signal.

In addition, in the mobile terminal testing method of the present invention, in the setting of the scheduling information, the scheduling information may be set such that switching between the first carrier and the second carrier in the uplink is performed in a slot of any one of the first carrier and the second carrier, and in the displaying, a range of the slot in which the switching is performed may be further displayed on the same time axis.

With this configuration, the mobile terminal testing method of the present invention can set scheduling information suitable for the test even if a case where the UL carrier changes in slot units as in UL switching is tested. In addition, the first UL signal transmitted by the first carrier and the second UL signal transmitted by the second carrier can be measured simultaneously or in parallel based on the scheduling information suitable for the test, so that it is possible to perform the measurement of the first UL signal and the second UL signal even if the case where the UL carrier changes in slot units as in UL switching is tested.

Advantage of the Invention

According to the present invention, it is possible to provide a mobile terminal testing device capable of testing a case where a UL carrier, such as a cell or a frequency band for transmitting UL signals, changes in slot units as in UL switching, and a mobile terminal testing method.

BRIEF DESCRIPTION OF THE DRAWINGS

FIGS. 2A and 2B are diagrams illustrating an example of an antenna configuration of the mobile terminal, in which FIG. 2A illustrates an antenna configuration when FDD is used for an uplink and FIG. 2B illustrates an antenna configuration when TDD is used for the uplink.

FIGS. 7A and 7B are diagrams illustrating a time position of a switching period Ts in carrier switching, in which FIG. 7A illustrates a case where UL switching is performed on carrier 1 and FIG. 7B illustrates a case where UL switching is performed on carrier 2.

FIG. 8 is a diagram illustrating an example of scheduling information in UL switching (CA-based UL switching) for switching used cells in slot units.

FIG. 9 is a diagram illustrating an example of scheduling information in UL switching (SUL-based UL switching) for switching frequency bands in slot units.

FIGS. 10A and 10B are diagrams illustrating signal paths from the mobile terminal to the mobile terminal testing device in a test of a CA-based UL switching function, in which FIG. 10A illustrates a signal path of a UL signal of a primary cell and FIG. 10B illustrates a signal path of a UL signal of a secondary cell.

FIGS. 11A and 11B are diagram illustrating signal paths from the mobile terminal to the mobile terminal testing device in a test of an SUL-based UL switching function, in which FIG. 11A illustrates a signal path of an NUL signal and FIG. 11B illustrates a signal path of an SUL signal.

BEST MODE FOR CARRYING OUT THE INVENTION

Hereinafter, embodiments of the present invention will be described with reference to the drawings.

Figure 1:
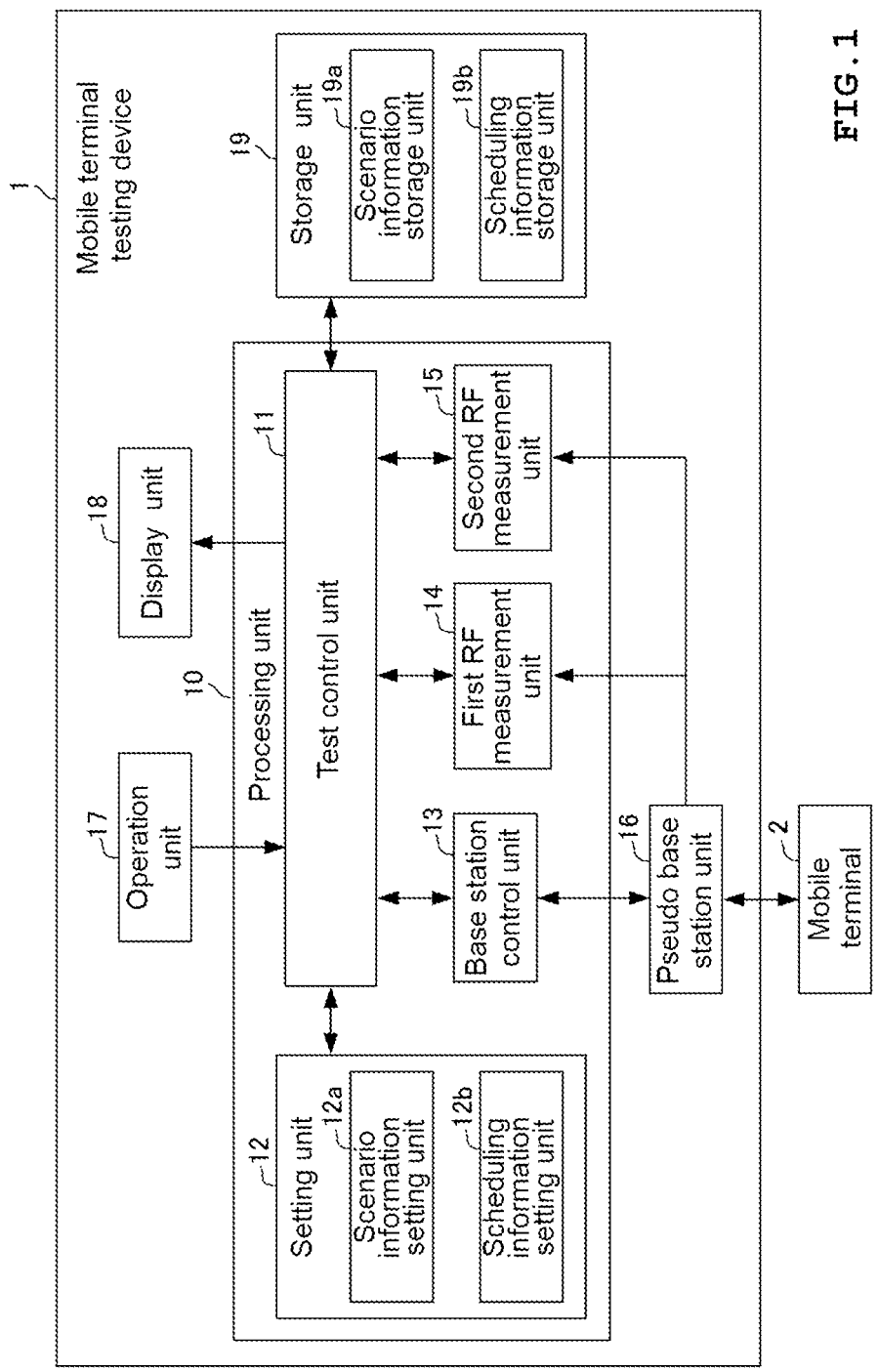
FIG. 1 is a block diagram illustrating a configuration of a mobile terminal testing device according to one embodiment of the present invention.

FIG. 1 is a block diagram illustrating a configuration of a mobile terminal testing device 1 according to the present embodiment. The mobile terminal testing device 1 tests a mobile terminal 2 by simulating a base station of mobile communication based on scheduling information. As illustrated in FIG. 1, the mobile terminal testing device 1 includes a processing unit 10, a pseudo base station unit 16, an operation unit 17, a display unit 18, and a storage unit 19. Hereinafter, the components will be described.

The processing unit 10 performs processing such as preparation, execution, measurement, analysis, and evaluation of a test, and includes a test control unit 11, a setting unit 12, a base station control unit 13, a first RF measurement unit 14, and a second RF measurement unit 15 as illustrated in FIG. 1. The first RF measurement unit 14 and the second RF measurement unit 15 correspond to the first measurement unit and the second measurement unit of the present invention, respectively, and the base station control unit 13 (which may include the test control unit 11) corresponds to the control unit of the present invention.

The test control unit 11 controls the test that is executed based on scenario information and/or scheduling information in order to test the mobile terminal 2 to acquire an execution result of the test and evaluate the execution result if necessary. In the test, for example, a UL switching function of the mobile terminal 2, which will be described later, is examined. The evaluation is performed based on evaluation criteria established for each test.

The setting unit 12 generates or sets information necessary for testing the mobile terminal 2, and includes a scenario information setting unit 12a and a scheduling information setting unit 12b.

The scenario information setting unit 12a generates or sets scenario information. The scenario information includes information about an operation sequence in which an operation of the mobile terminal testing device 1 is set or information about a communication sequence in which transmission/reception signals with the mobile terminal 2 are set.

The scheduling information setting unit 12b generates or sets scheduling information. The scheduling information is information for specifying any one of a first carrier and a second carrier for each slot of an uplink from the mobile terminal 2 to the base station as a communication resource (a cell, a frequency band, or the like) used for the uplink. The scheduling information setting unit 12b generates or sets the scheduling information based on test parameters indicating test items and the like, which are input by a user via the operation unit 17. FIGS. 8 and 9 illustrate examples of scheduling information set by the scheduling information setting unit 12b as will be described later.

Specifically, the first carrier as the communication resource is, for example, a UL carrier of a first cell of FDD, and the second carrier as the communication resource is, for example, a UL carrier of a second cell of TDD. More specifically, the first cell is a PCell, and the second cell is an SCell.

Further, the first carrier as the communication resource may be, for example, a UL carrier of a first frequency band of TDD, and the second carrier may be, for example, a UL carrier of a second frequency band of the same cell as the first frequency band. Specifically, the first frequency band may be NUL and the second frequency band may be SUL.

Further, the scheduling information setting unit 12b may set the scheduling information such that switching between the first carrier and the second carrier in the uplink is performed in a slot of any one of the first carrier and the second carrier.

The base station control unit 13 controls the test that is performed by controlling the pseudo base station unit 16 based on the scenario information and/or the scheduling information, and performing communication between the pseudo base station unit 16 and the mobile terminal 2. Specifically, the base station control unit 13 generates or acquires transmission data such as an radio resource control (RRC) message and downlink control information (DCI) based on the scenario information and/or the scheduling information, and transmits the transmission data from the pseudo base station unit 16 to the mobile terminal 2 to establish a call connection between the pseudo base station unit 16 and the mobile terminal 2 or to perform a predetermined communication sequence.

The pseudo base station unit 16 simulates a base station for communicating with the mobile terminal 2 under the control of the base station control unit 13 or the test control unit 11. The pseudo base station unit 16 simulates a base station operated according to, for example, the 5th Generation (5G) new radio (NR) communication standard or the 4G long term evolution (LTE) or LTE-A communication standard. The pseudo base station unit 16 transmits and receives signals to and from the mobile terminal 2 by wire via a coaxial cable or the like, or wirelessly transmits and receives to and from the mobile terminal 2 via an antenna. The pseudo base station unit 16 performs down-conversion, analog-to-digital (A/D) conversion, orthogonal demodulation, and the like on the signal received from the mobile terminal 2 to acquire in-phase/quadrature-phase (I/Q) data. The I/Q data are sent to the first RF measurement unit 14 and the second RF measurement unit 15.

The first RF measurement unit 14 measures a first UL signal transmitted from the mobile terminal 2 to the pseudo base station unit 16 using the first carrier based on the scheduling information, and sends a measurement result to the test control unit 11. The second RF measurement unit 15 measures a second UL signal transmitted from the mobile terminal 2 to the pseudo base station unit 16 using the second carrier based on the scheduling information, and sends a measurement result to the test control unit 11. Specifically, the first RF measurement unit 14 and the second RF measurement unit 15 acquire, for example, I/Q data from the pseudo base station unit 16, respectively, to perform demodulating processing and analysis (measurement) processing on the I/Q data. In addition, the first RF measurement unit 14 and the second RF measurement unit 15 measure power of the first UL signal and the second UL signal, respectively. The first RF measurement unit 14 and the second RF measurement unit 15 may measure power or a signal waveform of each of the first UL signal and the second UL signal before the UL switching, during the UL switching, and after the UL switching based on the scheduling information (see FIG. 12). The measurement results are sent to the test control unit 11.

The operation unit 17 includes any combination of a touch pad constituting a touch panel, a pointing device such as a mouse or a tracking ball, a keyboard device, and the like. The operation unit 17 receives operations on the test control unit 11, such as selection of test items, execution instruction of the test, setting of test parameters, display instruction of test results, and the like. Examples of the test parameter include whether or not the UL switching function is tested, switching periods, carriers in which the switching periods are arranged, and the like. Information input by the operation unit 17 is sent to the test control unit 11.

The display unit 18 includes an image display device such as a liquid crystal display, and displays setting contents of the scenario information or the scheduling information, test results, and the like. The display unit 18 displays, on the same time axis, a time waveform of the first UL signal measured by the first RF measurement unit 14, and a time waveform of the second UL signal measured by the second RF measurement unit 15. In addition to the time waveforms, the display unit 18 further displays, on the same time axis, a range of the carriers or slots, for example, a range of slots in which the UL switching is performed.

The storage unit 19 includes a random access memory (RAM), a hard disk drive (HDD), a solid state memory (SSD), a flash memory, and the like, and stores information about the test. The storage unit 19 includes a scenario information storage unit 19*a* and a scheduling information storage unit 19*b*. The scenario information storage unit 19*a* stores the scenario information generated or set by the scenario information setting unit 12*a*, test parameters, test result information, and the like. The scenario information includes test parameters indicating whether or not the UL switching function is tested. The scheduling information storage unit 19*b* stores the scheduling information generated or set by the scheduling information setting unit 12*b*.

The mobile terminal testing device 1 is composed of a computer device (not illustrated) including a communication module for performing communication with the mobile terminal 2. For example, the computer device includes a central processing unit (CPU), a read only memory (ROM), a RAM, HDD, an external storage device such as HDD or a flash memory, an input and output port, and a touch panel (which are not illustrated).

A program for causing the computer device to function as the mobile terminal testing device 1 is stored in the ROM and the external storage device of the computer device. That is, the computer device functions as the mobile terminal testing device 1 by the CPU that executes the program stored in the ROM or the like using the RAM as a work region.

As described above, according to the present embodiment, the storage unit 19 includes the RAM or the external storage device, and the processing unit 10 includes the CPU and the like, and the pseudo base station unit 16 includes a communication module. The pseudo base station unit 16 may be configured as a separate device from the computer device including the processing unit 10 and the like.

<Mobile Terminal>

Figure 2A:
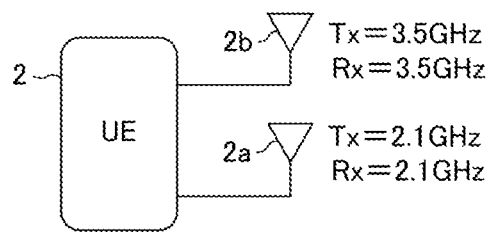
Figure 2B:
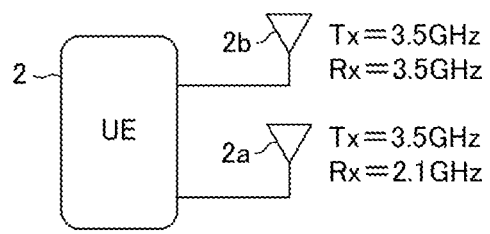

In a typical commercial mobile terminal (user equipment (UE)), some hardware limitations allow only a maximum of two transmitters (Tx) to be used in the uplink. FIGS. 2A and 2B are diagrams illustrating an example of an antenna configuration of the mobile terminal 2. FIG. 2A illustrates a case where an antenna 2*a* is used, for example, in the 2.1 GHz band for an uplink and a downlink in a cell of FDD. FIG. 2B illustrates a case where both the antenna 2*a* and an antenna 2*b* are used, for example, in the 3.5 GHZ band for an uplink in a cell of TDD. In this manner, the antenna 2*a* of the mobile terminal 2 can be used by switching the band between the 2.1 GHZ band and the 3.5 GHz band.

In a region in which TDD can be used, multi input multi output (MIMO) at a high frequency can gain a data rate. Moreover, generally, the TDD band has a higher frequency band than the FDD band and is superior in terms of bandwidth (the higher the frequency band, the wider the bandwidth). On the other hand, since the TDD has a high frequency band, a region in which the signal reaches is narrow. In addition, since the downlink and uplink of the TDD have the same frequency, the uplink basically cannot be output in the slot to which the downlink is assigned. Considering these characteristics, the scheduling of UL switching between the TDD and the FDD is determined.

<UL Switching>

Next, UL switching will be described.

The UL switching (Uplink Tx Switching) is a mechanism for increasing the data rate of the uplink by switching slots for uplink transmission between the PCell and the SCell or between the NUL and the SUL. The UL switching includes, for example, carrier aggregation (CA)-based UL switching and SUL-based UL switching.

1. CA-Based UL Switching (NUL+NUL)

The "CA-based UL switching" refers to a function of increasing uplink throughput by switching, in slot units, the UL carrier of an NR wireless communication system which corresponds to inter-band 2CA in a non-stand alone (NSA) mode or stand alone (SA) mode. In other words, this type of UL switching switches used cells in slot units.

Figure 3:
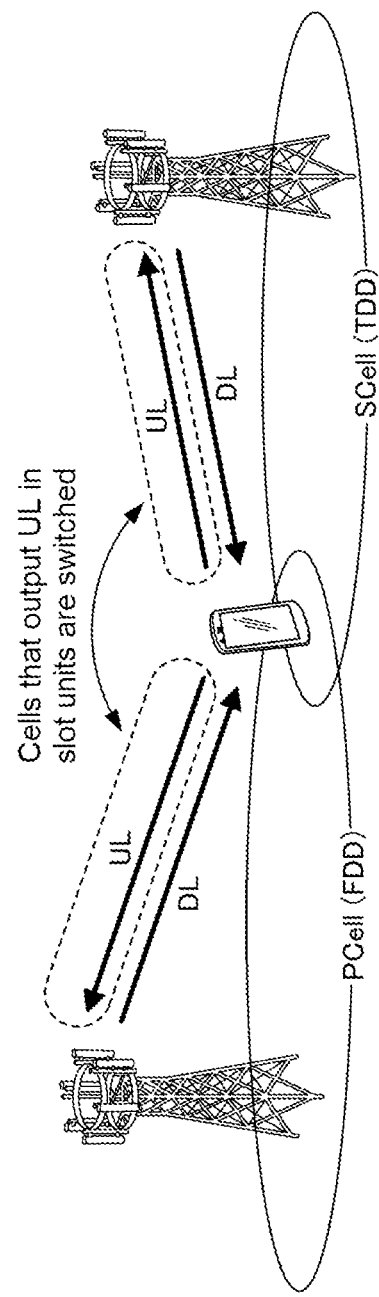
FIG. 3 is a diagram explaining UL switching (CA-based UL switching) for switching used cells in slot units.
Figure 4:
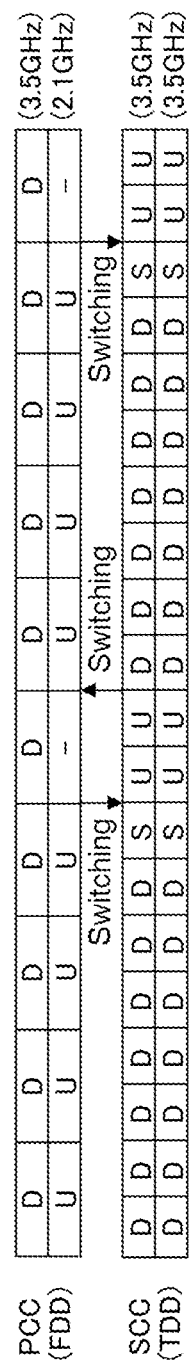
FIG. 4 is a diagram illustrating an example in which each slot is assigned in an uplink or downlink direction in the UL switching illustrated in FIG. 3.

FIG. 3 is a diagram explaining UL switching (CA-based UL switching) for switching used cells in slot units, and FIG. 4 is a diagram illustrating an example in which each slot is assigned in an uplink or downlink direction in the UL switching illustrated in FIG. 3. In FIG. 4, "D" indicates that the slot is assigned to the DL signal, "U" indicates that the slot is assigned to the UL signal, and "S" indicates that the slot is assigned to the special link signal. As illustrated in FIGS. 3 and 4, for example, in an area where both PCC of the primary cell (PCell) of FDD and SCC of the secondary cell (SCell) of TDD can be used, the mobile terminal 2 corresponding to inter-band 2CA can output UL slots of TDD to the uplink with 2×2 MIMO to improve uplink capacity (data rate, throughput, and the like) and latency.

2. SUL-Based UL Switching (NUL+SUL)

The "SUL-based UL switching" refers to a function of increasing uplink throughput by switching, in slot units, the UL slot between the SUL and the NUL of TDD in a non-stand alone (NSA) mode or stand alone (SA) mode. In other words, this type of UL switching switches frequency bands in slot units.

Figure 5:
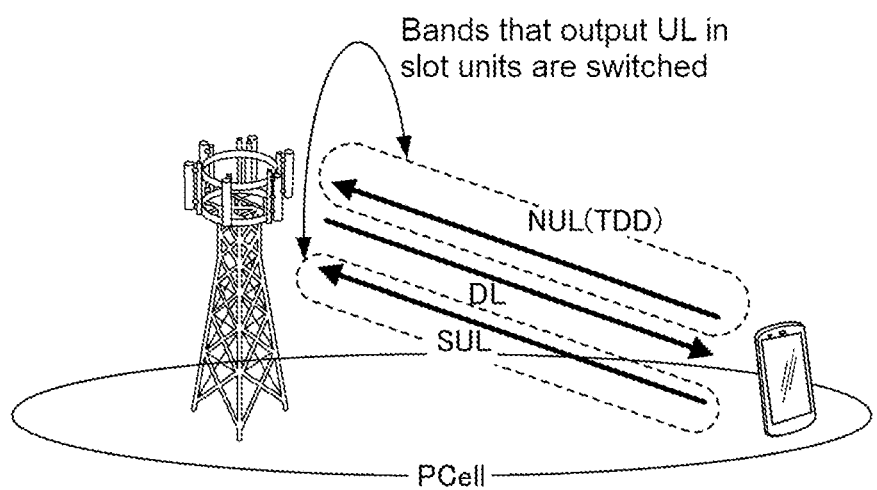
FIG. 5 is a diagram explaining UL switching (SUL-based UL switching) for switching frequency bands in slot units.
Figure 6:
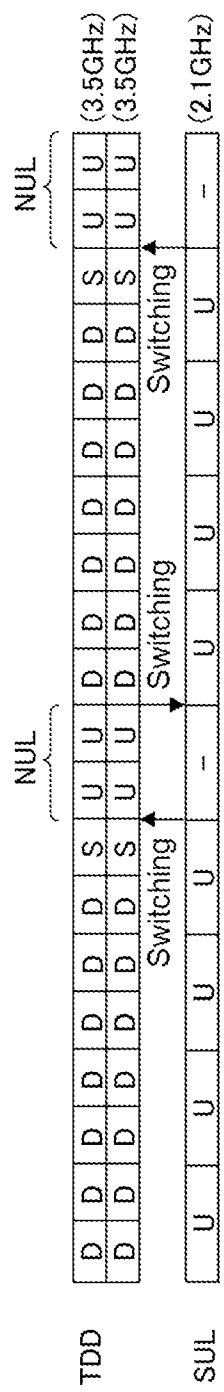
FIG. 6 is a diagram illustrating an example in which each slot is assigned in the uplink or downlink direction in the UL switching illustrated in FIG. 5.

FIG. 5 is a diagram explaining UL switching for switching frequency bands in slot units in the same cell, and FIG. 6 is a diagram illustrating an example in which each slot is assigned in the uplink or downlink direction in the UL switching illustrated in FIG. 5. As illustrated in FIGS. 5 and 6, when the SUL can be used, by using SUL in a slot in which no UL slot of TDD is assigned, it is possible to improve uplink capacity and latency.

For the UL switching, for example, 3GPP TS38.214 6.1.6 provides a functional overview, and TS38.521-1 6.3A. 3 defines a method of time mask measurement. The time mask measurement of a time mask refers to measurement or test for confirming whether or not a signal complying with the above standard is output from the mobile terminal 2 during the UL switching.

Figure 7A:
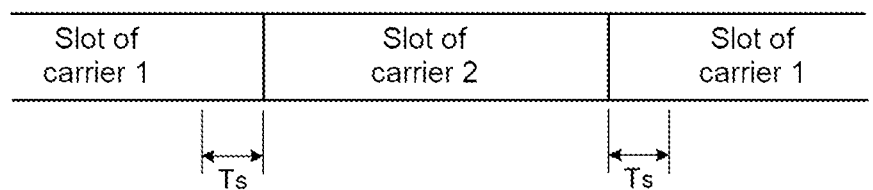
Figure 7B:
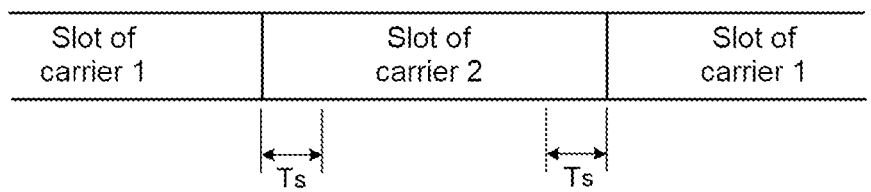

FIGS. 7A and 7B are diagrams illustrating a time position of a switching period Ts in carrier switching, in which FIG. 7A illustrates a case where UL switching is performed on carrier 1 and FIG. 7B illustrates a case where UL switching is performed on carrier 2. Specifically, the RRC message can specify the carrier and switching period for which UL switching is performed.

In 5G NR, one radio frame (10 ms) is composed of ten subframes (1 ms), one subframe is composed of one or more slots, and one slot is 14 orthogonal frequency division multiplexing (OFDM) symbols.

<Scheduling Information>

FIG. 8 is a diagram illustrating an example of scheduling information in UL switching for switching used cells in slot units. When the test parameter indicating whether or not the test of the UL switching function is performed is set to ON, the scheduling information setting unit 12*b* generates or sets the scheduling information illustrated in FIG. 8 (when switching period=140 μs).

The scheduling information includes items of "Subframe No.", "Slot No.", "Slot Type", "UL DCI", "K2", "UL Type", "UL S", and "UL L" for the primary cell of FDD, and includes items of "Slot Type", "UL DCI", "K2", "UL Type", "UL S", and "UL L" for the secondary cell of TDD.

"Subframe No." represents a subframe number. "Slot No." represents a slot number. "Slot Type" represents whether the slot is assigned to a UL signal, DL signal, or a special link signal. Specifically, "U" in "Slot Type" indicates a case where the slot is assigned to the UL signal, "D" indicates a case where the slot is assigned to the DL signal, and "S" indicates a case where the slot is assigned to the special link signal.

"UL DCI" indicates whether or not physical uplink control channel (PUCCH) scheduling information is valid. In "UL DCI", "ON" is displayed when the PUSCH scheduling information is valid. "K2" indicates a transmission timing of PUSCH. "UL Type" indicates a demodulation reference signal (DMRS) mapping type of a UL signal defined by 3GPP. "UL S" represents a start symbol of the slot of the UL signal. "UL L" represents a symbol length of the slot of the UL signal.

FIG. 9 is a diagram illustrating an example of scheduling information in UL switching for switching frequency bands in slot units. When the test parameter indicating whether or not the test of the UL switching function performed is set to ON, the scheduling information setting unit 12b sets the scheduling information as illustrated in FIG. 9 (when switching period=140 μs).

The scheduling information includes items of "Slot No.", "Slot Type", "UL DCI", "K2", "UL Type", "UL S", and "UL L" for the NUL of TDD, and includes items of "Slot No.", "Slot Type", "UL DCI", "K2", and "UL Type" for the SUL. The meaning of each item is as described above.

<Mobile Terminal Testing Method>

Next, a mobile terminal testing method will be described with reference to the drawings.

Figure 13:
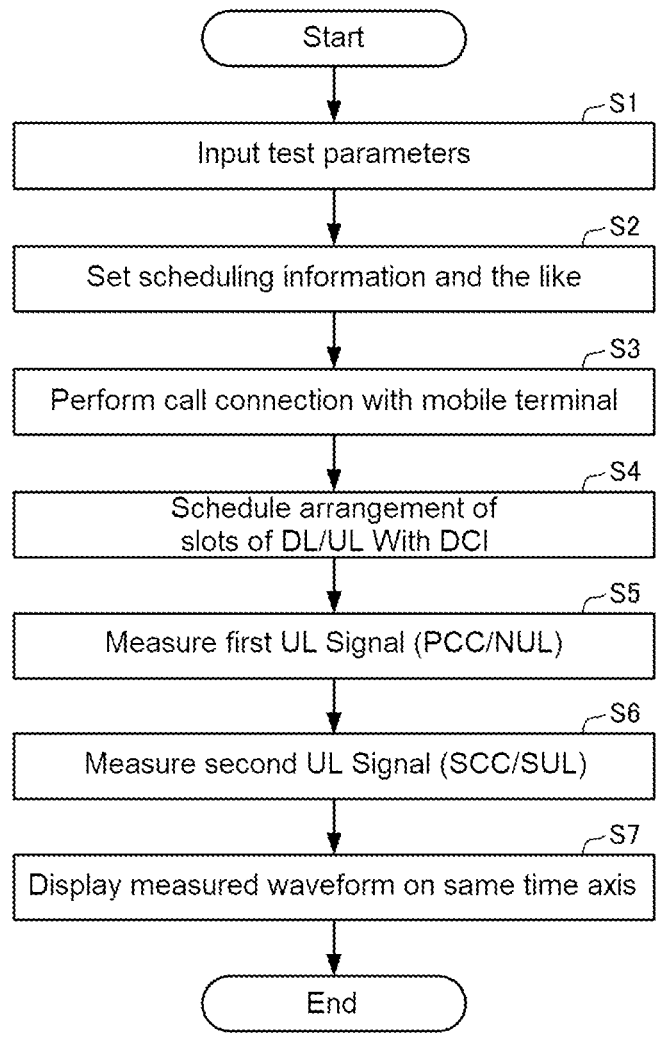
FIG. 13 is a flowchart illustrating a procedure of a mobile terminal testing method according to one embodiment of the present invention.

FIG. 13 is a flowchart illustrating a procedure of a mobile terminal testing method. First, a user operates the operation unit 17 to input test parameters (step S1). The test parameters are parameters indicating information necessary for the testing, and examples thereof include test parameters indicating whether or not the UL switching function is tested, whether or not the CA-based UL switching function is tested, whether or not the SUL-based UL switching function is tested, switching periods, carriers or slots in which the switching periods are present, and the like. The operation unit 17 sends the input test parameters to the test control unit 11. The test control unit 11 sends the test parameters to the setting unit 12 and stores the same in the storage unit 19.

Next, the scenario information setting unit 12a of the setting unit 12 generates or sets scenario information based on the test parameters. The scenario information setting unit 12a sends the generated scenario information to the test control unit 11. The test control unit 11 sends the scenario information to the scenario information storage unit 19a for storage.

In addition, the scheduling information setting unit 12b of the setting unit 12 generates or sets scheduling information based on the test parameters (step S2). The scheduling information setting unit 12b sends the generated scheduling information to the test control unit 11. The test control unit 11 sends the scheduling information to the base station control unit 13, the first RF measurement unit 14, and the second RF measurement unit 15, and if necessary, sends the scheduling information to the scheduling information storage unit 19b to store the scheduling information.

The base station control unit 13 controls the pseudo base station unit 16 based on the scenario information to perform a call connection with the mobile terminal 2 (step S3).

Next, the base station control unit 13 generates or acquires an RRC message or DCI based on necessary information such as test parameters, scenario information, scheduling information, and the like, and transmits the same from the pseudo base station unit 16 to the mobile terminal 2. The RRC message can include information which specifies the carrier in which the UL switching is performed or the switching period. DCI is control information transmitted on the downlink (DL) and includes information for scheduling DL/UL slot arrangement. The pseudo base station unit 16 schedules the DL/UL slot arrangement in the mobile terminal 2 by sending the DCI to the mobile terminal 2 (step S4).

Next, the pseudo base station unit 16 receives the UL signal from the mobile terminal 2. For example, the UL signal is switched in slot units between the first UL signal transmitted using the first carrier (PCC of primary cell of FDD) and the second UL signal transmitted using the second carrier (SCC of secondary cell of TDD). Alternatively, for example, the UL signal is switched in slot units between the first UL signal transmitted using the first carrier (NUL of TDD) and the second UL signal transmitted using the second carrier (SUL).

Next, the first RF measurement unit 14 measures the first UL signal transmitted using the first carrier based on the scheduling information (step S5). Simultaneously or in parallel, the second RF measurement unit 15 measures the second UL signal transmitted using the second carrier based on the scheduling information (step S6).

Specifically, for example, when testing the CA-based UL switching function, the first RF measurement unit 14 measures a signal on a PCC side, and the second RF measurement unit 15 measures a signal on an SCC side. In addition, when testing the SUL-based UL switching function, the first RF measurement unit 14 measures a signal on an NUL side, and the second RF measurement unit 15 measures a signal on an SUL side.

Figure 10A:
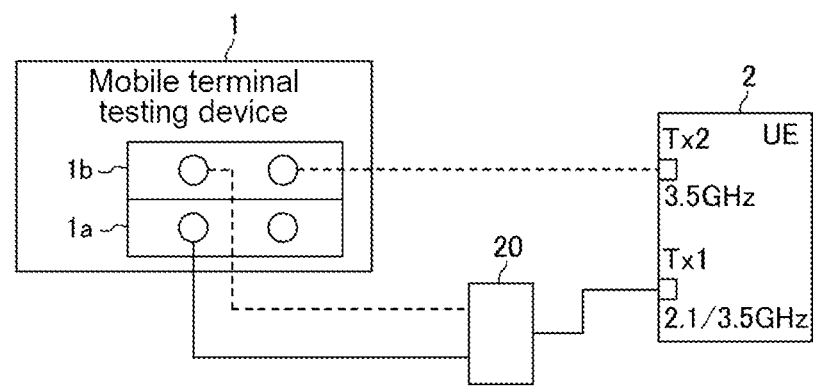
Figure 10B:
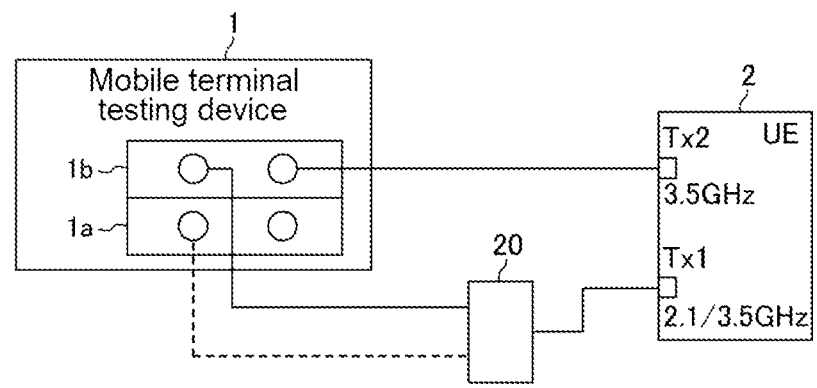

FIGS. 10A and 10B are diagrams illustrating signal paths from the mobile terminal 2 to the mobile terminal testing device 1 in the test of the CA-based UL switching function. As illustrated in FIG. 10A, as the UL signal of the primary cell of FDD, a 2.1 GHZ band signal (signal on PCC side) from a transmitter Tx1 of the mobile terminal 2 is input to a module 1a of the mobile terminal testing device 1 through a combiner 20 (2.1 GHZ band SISO). In addition, as illustrated in FIG. 10B, as the UL signal of the secondary cell of TDD, a 3.5 GHz band signal (signal on SCC side) from the transmitter Tx1 of the mobile terminal 2 is input to a module 1b of the mobile terminal testing device 1 through the combiner 20, and the 3.5 GHZ signal from a transmitter Tx2 of the mobile terminal 2 is input to the module 1b of the mobile terminal testing device 1 (3.5 GHz band MIMO).

Figure 11A:
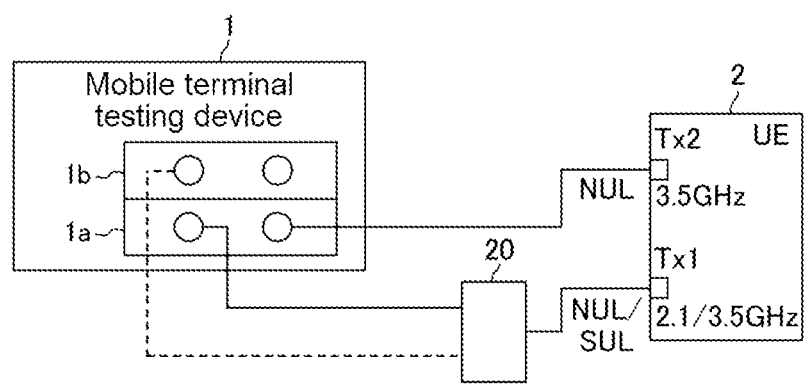
Figure 11B:
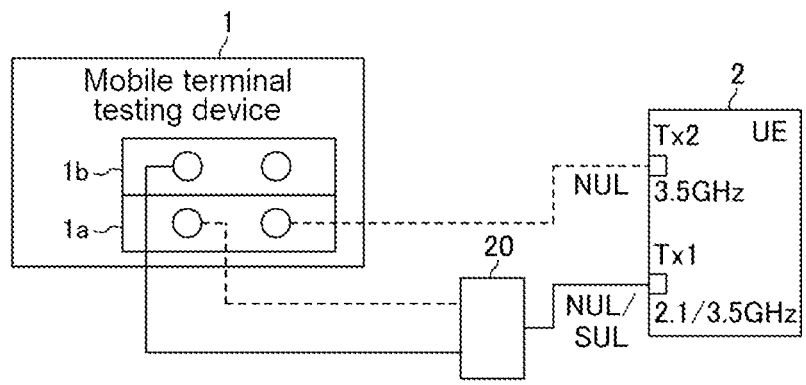

FIGS. 11A and 11B illustrate signal paths from the mobile terminal 2 to the mobile terminal testing device 1 in the SUL-based UL switching. As illustrated in FIG. 11A, the NUL signal is input from the transmitter Tx1 of the mobile terminal 2 to the module 1a of the mobile terminal testing device 1 through the combiner 20, and is input from the transmitter Tx2 of the mobile terminal 2 to the module 1a (2×2 MIMO). As illustrated in FIG. 11B, the SUL signal is input from the transmitter Tx1 of the mobile terminal 2 to the module 1b of the mobile terminal testing device 1 through the combiner 20 (SISO). The mobile terminal testing device 1 may include the combiner 20.

Next, the display unit 18 displays, on the same time axis, a time waveform obtained from the first UL signal measured by the first RF measurement unit 14, and a time waveform obtained from the second UL signal measured by the second RF measurement unit 15 (step S7). Specifically, for example, when testing the CA-based UL switching function, the display unit 18 displays, on the same time axis, a time waveform of the signal on the PCC side and a time waveform of the signal on the SCC side. In addition, when testing the SUL-based UL switching function, the display unit 18 displays, on the same time axis, a time waveform of the signal on the NUL side and a time waveform of the signal on the SUL side. In addition to these time waveforms, the display unit 18 further displays slot ranges on the same time axis.

Figure 12:
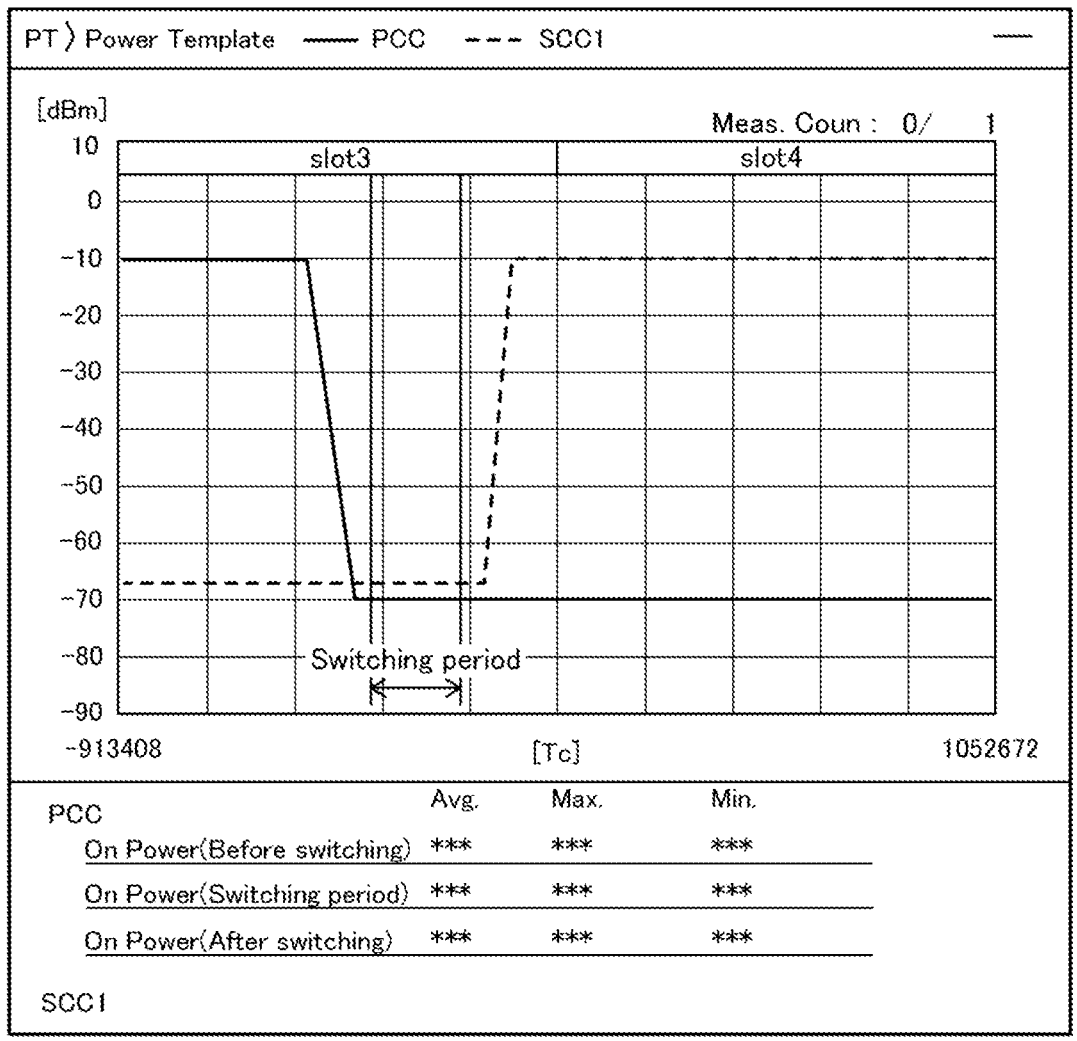
FIG. 12 is a diagram illustrating an example of an image that is displayed on a display unit of the mobile terminal testing device according to one embodiment of the present invention.

FIG. 12 is a diagram illustrating an example of a display image of the display unit 18 of the mobile terminal testing device 1. In FIG. 12, the measured PCC waveform and the measured SCC waveform are displayed on the same time axis in the test of the CA-based UL switching function. In addition, the slot ranges are also displayed on the same time axis. FIG. 12 illustrates ranges of slot 3 and slot 4. From FIG. 12, it is possible to confirm a switching period in which no UL signal is present in a region in which the PCC waveform and the SCC waveform are switched. Also, it can be seen that the switching period is present in slot 3.

The test control unit 11 may cause the display unit 18 to display various measurement results other than the time waveforms, and may cause the display unit 18 to display evaluation results by evaluating the measurement results. The mobile terminal testing device 1 can selectively perform throughput measurement, Tx measurement, and time mask measurement, for example. In uplink throughput measurement, the total value of PCC and SCC or NUL and SUL may be calculated for two frames.

<Action and Effect>

As described above, in the mobile terminal testing device 1 according to the present embodiment, the scheduling information setting unit 12b sets scheduling information for specifying any one of the first carrier and the second carrier used for an uplink from the mobile terminal 2 to the base station, for each slot of an UL signal, the first RF measurement unit 14 measures the first UL signal, which is transmitted from the mobile terminal 2 to the pseudo base station unit 16 using the first carrier, based on the scheduling information, and the second RF measurement unit 15 measures the second UL signal, which is transmitted from the mobile terminal 2 to the pseudo base station unit 16 using the second carrier, based on the scheduling information.

With this configuration, in the mobile terminal testing device 1 of the present embodiment, the scheduling information setting unit 12b can set scheduling information suitable for the test even if a case where the UL carrier changes in slot units as in UL switching is tested. In addition, the first RF measurement unit 14 corresponding to the first carrier and the second RF measurement unit 15 corresponding to the second carrier are separately provided to measure the first UL signal and the second UL signal simultaneously or in parallel based on the scheduling information suitable for the test, so that it is possible to perform the measurement of the first UL signal and the second UL signal even if a case where the UL carrier changes in slot units as in UL switching (for example, time mask measurement) is tested.

Further, in the mobile terminal testing device 1 of the present embodiment, the first carrier is the carrier of the primary cell (PCell) of FDD, and the second carrier is the carrier of the secondary cell (SCell) of TDD. With this configuration, it is possible to test a case where a cell for transmitting UL signals changes in slot units as in CA-based UL switching is tested. For example, in an area in which both the PCC of the primary cell (PCell) of FDD and the SCC of the secondary cell (SCell) of TDD can be used, the mobile terminal 2 corresponding to inter-band 2CA can test the UL switching function of switching the UL carrier between PCC and SCC.

Further, in the mobile terminal testing device 1 of the present embodiment, the first carrier is the carrier of NUL of TDD, and the second carrier is the carrier of SUL in the same cell as NUL. With this configuration, it is possible to test a case where a frequency band for transmitting UL signals changes in slot units as in UL switching. For example, it is possible to test the UL switching function of improving uplink capacity and latency by switching the UL carrier between the SUL and the NUL such that the SUL is used in a slot in which the NUL slot of TDD is not assigned.

Further, the mobile terminal testing device 1 of the present embodiment includes the display unit 18 that displays, on the same time axis, a time waveform of the first UL signal measured by the first RF measurement unit 14, and a time waveform of the second UL signal measured by the second RF measurement unit 15. With this configuration, it is possible to easily confirm the switching period necessary for switching between the first UL signal and the second UL signal. Accordingly, it is possible to easily perform time mask measurement in the test of the UL switching function.

Further, in the mobile terminal testing device 1 of the present embodiment, the scheduling information setting unit 12b can set the scheduling information such that switching between the first carrier and the second carrier in the uplink is performed in a slot of any one of the first carrier and the second carrier. In addition, the display unit 18 further displays, on the same time axis, a range of the slot in which the switching is performed. With this configuration, it is possible to easily determine suitability of slots or carriers in which the UL switching has been performed.

Although the embodiments of the present invention have been described by way of example of the mobile terminal testing device that tests the mobile terminal conforming to the 5G NR standard and the mobile terminal testing method, the applicable standard is not limited to 5G NR, and may use other standards.

INDUSTRIAL APPLICABILITY

As described above, the present invention has the effect to test a case where a UL carrier, such as a cell or a frequency band for transmitting UL signals, changes in slot units as in UL switching, and is useful for the entire mobile terminal testing device and mobile terminal testing method.

DESCRIPTION OF REFERENCE NUMERALS AND SIGNS

1 Mobile terminal testing device
2 Mobile terminal
10 Processing unit
11 Test control unit
12 Setting unit
12a Scenario information setting unit
12b Scheduling information setting unit
13 Base station control unit (control unit)
14 First RF measurement unit (first measurement unit)
15 Second RF measurement unit (second measurement unit)
16 Pseudo base station unit
17 Operation unit
18 Display unit
19 Storage unit 19a Scenario information storage unit
19b Scheduling information storage unit
20 Combiner

What is claimed is:

1. A mobile terminal testing device that tests a mobile terminal, comprising:
    a pseudo base station unit that simulates a base station communicating with the mobile terminal;
    a setting unit that sets scheduling information for specifying any one of a first carrier and a second carrier for each slot of an uplink from the mobile terminal to the base station as a communication resource used for the uplink;
    a control unit that controls the pseudo base station unit based on the scheduling information;
    a first measurement unit that measures a first uplink signal, which is transmitted from the mobile terminal to the pseudo base station unit using the first carrier, based on the scheduling information; and
    a second measurement unit that measures a second uplink signal, which is transmitted from the mobile terminal to the pseudo base station unit using the second carrier, based on the scheduling information.

2. The mobile terminal testing device according to claim 1,
    wherein the first carrier is a carrier of a first cell using frequency division duplex (FDD), and the second carrier is a carrier of a second cell using time division duplex (TDD).

3. The mobile terminal testing device according to claim 1,
    wherein the first carrier is a carrier of a first frequency band using time division duplex (TDD), and the second carrier is a carrier of a second frequency band using the time division duplex (TDD) in the same cell as the first frequency band.

4. The mobile terminal testing device according to claim 1, further comprising:
    a display unit that displays, on the same time axis, a time waveform of the first uplink signal measured by the first measurement unit and a time waveform of the second uplink signal measured by the second measurement unit.

5. The mobile terminal testing device according to claim 4,
    wherein the setting unit sets the scheduling information such that switching between the first carrier and the second carrier in the uplink is performed in a slot of any one of the first carrier and the second carrier, and the display unit further displays, on the same time axis, a range of the slot in which the switching is performed.

6. A mobile terminal testing method, which is performed by a mobile terminal testing device including a pseudo base station unit that simulates a base station communicating with a mobile terminal and testing the mobile terminal, the mobile terminal testing method comprising:
    setting scheduling information for specifying any one of a first carrier and a second carrier for each slot of an uplink from the mobile terminal to the base station as a communication resource used for the uplink;
    controlling the pseudo base station unit based on the scheduling information;
    measuring a first uplink signal, which is transmitted from the mobile terminal to the pseudo base station unit using the first carrier, based on the scheduling information; and
    measuring a second uplink signal, which is transmitted from the mobile terminal to the pseudo base station unit using the second carrier, based on the scheduling information.

7. The mobile terminal testing method according to claim 6,
    wherein the first carrier is a carrier of a first cell using frequency division duplex (FDD), and the second carrier is a carrier of a second cell using time division duplex (TDD).

8. The mobile terminal testing method according to claim 6,
    wherein the first carrier is a carrier of a first frequency band using time division duplex (TDD), and the second carrier is a carrier of a second frequency band using the time division duplex (TDD) in the same cell as the first frequency band.

9. The mobile terminal testing method according to claim 6, further comprising:
    displaying, on the same time axis, a time waveform of the measured first uplink signal and a time waveform of the measured second uplink signal.

10. The mobile terminal testing method according to claim 9,
    wherein in the setting of the scheduling information, the scheduling information is set such that switching between the first carrier and the second carrier in the uplink is performed in a slot of any one of the first carrier and the second carrier, and in the displaying, a range of the slot in which the switching is performed is further displayed on the same time axis.

* * * * *